Jan. 5, 1965 E. G. TARRY ETAL 3,164,024
DRIVE MECHANISM AND DIAPHRAGM PUMP EMPLOYING SAME
Filed Oct. 21, 1960 2 Sheets-Sheet 1
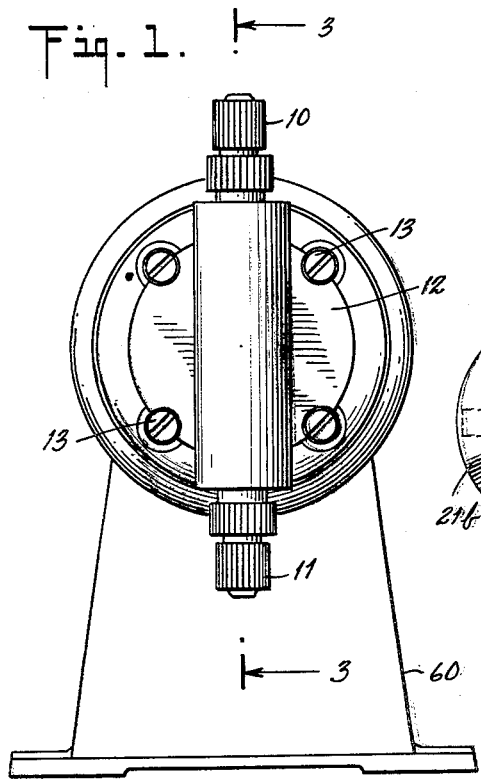
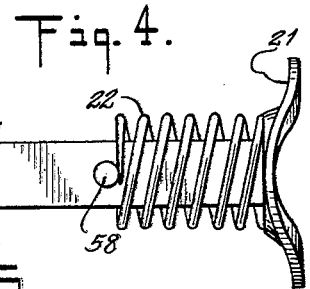
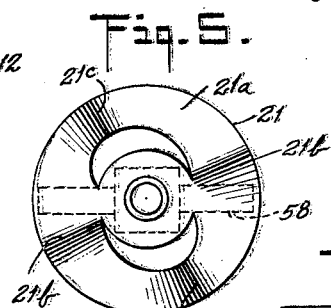
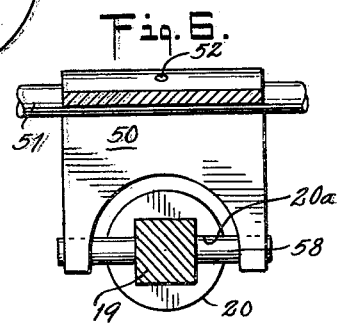
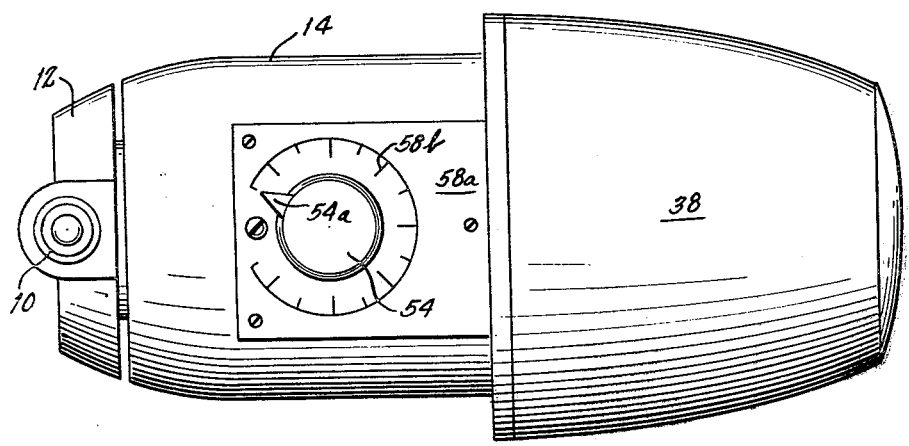
INVENTORS
ELDRED G. TARRY
WILLIAM C. CONKLING
LAWRENCE R. MITCHELL
BY
Robert S. Dunham
ATTORNEY INVENTORS
ELDRED G. TARRY
WILLIAM C. CONKLING
LAWRENCE R. MITCHELL
BY Robert S. Dunham
ATTORNEY United States Patent Office 3,164,024
Patented Jan. 5, 1965

3,164,024
DRIVE MECHANISM AND DIAPHRAGM PUMP
EMPLOYING SAME
Eldred G. Tarry, Westfield, William C. Conkling, Essex Fells, and Lawrence R. Mitchell, Fort Lee, N.J., assignors to Wallace & Tiernan Inc., a corporation of Delaware
Filed Oct. 21, 1960, Ser. No. 64,098
2 Claims. (Cl. 74—56)

This invention relates to a drive mechanism. More particularly, this invention relates to a drive mechanism suitable for use in association with a primary rotating driving member for converting rotary motion to translational motion. Still more particularly, this invention relates to a drive mechanism suitable for imparting reciprocating to-and-fro translational motion to a driven member.

In accordance with one specific embodiment, this invention relates to a diaphragm pump employing and operated by the drive mechanism of this invention.

Generally in a diaphragm pump the pumping stroke is relatively short due to the large ratio of effective piston diameter to the permissible or practical stroke. The driving force is thus relatively great as compared to a comparable conventional piston-type pump and the forces involved in the backward direction or during the return stroke are moderate since there is no packing friction. Accordingly, the requirements of a drive for a diaphragm pump are somewhat different from those for a drive used in association with a piston-type or plunger-type pump. However, non-symmetrical or out-of-line forces on the drive mechanism of a diaphragm pump can cause greater friction components, thus leading to more wasted power and requiring heavier parts than in a conventional piston-type pump of corresponding capacity but having a relatively long stroke.

Accordingly, it is an object of this invention to provide a rugged, durable, relatively trouble-free drive mechanism and a diaphragm pump employing the same.

It is another object of this invention to provide a simple, improved drive mechanism particularly adaptable for use in connection with a diaphragm pump.

Another object of this invention is to provide a drive mechanism and diaphragm pump employing the same which can be relatively readily and economically manufactured.

Still another object of this invention is to provide a drive mechanism adapted to be driven by an inexpensive electric industrial gear motor and associated reduction gear train for converting the gear motor output to useful motion, such as pumping motion when the drive mechanism is employed in connection with a diaphragm pump.

Still another object of this invention is to provide a drive mechanism in association with an electric gear motor and associated gearing to operate a diaphragm pump without transmitting any load except a balanced couple to the gear motor output shaft.

Yet another object of this invetnion is to provide a diaphragm pump the output of which is capable of being varied from zero to a given maximum.

How these and other objects of this invention are achieved will become apparent in the light of the accompanying drawings and specification wherein:

FIG. 1 is a side elevational view of a diaphragm pump actuated by the drive mechanism of this invention;

FIG. 2 is a plan view of the diaphragm pump illustrated in FIG. 1;

FIG. 4 is a side view showing a combination of elements, plunger rod or shaft, pin, return spring and cam plate employed in the drive mechanism of this invention;

FIG. 5 is an end view, more clearly illustrating the cam plate shown in FIG. 4;

FIG. 6 is a view taken along line 6—6 of FIG. 3 illustrating a combination of elements employed with the drive mechanism and diaphragm pump of this invention for adjusting the stroke of the drive mechanism and the output of the diaphragm pump.

Figure 3:
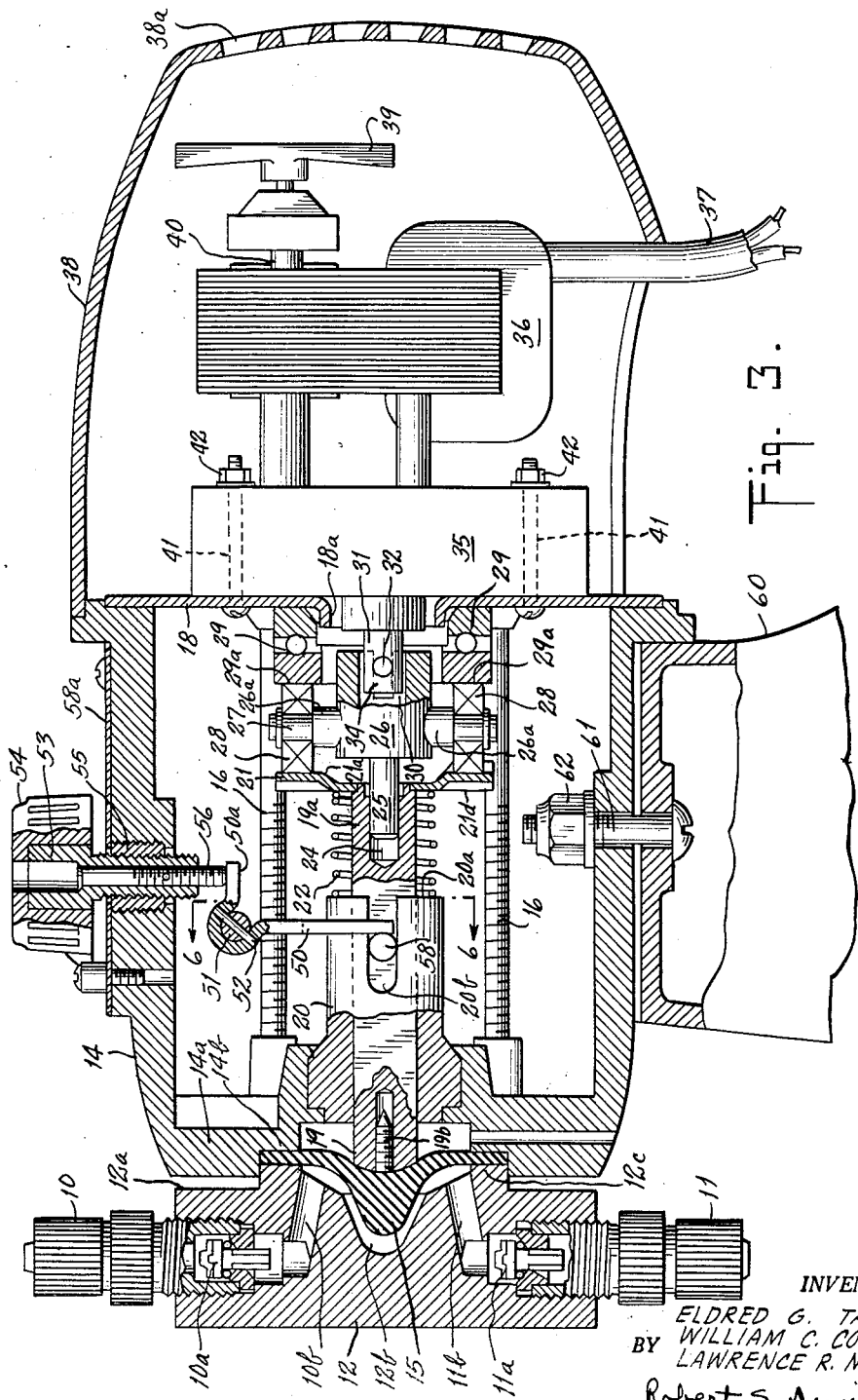
FIG. 3 is a view of the diaphragm pump taken along line 3—3 of FIG. 1 illustrating in partial cross section the drive mechanism of this invention.

The drive mechanism of this invention comprises a shaft element disposed and arranged for reciprocating to-and-fro longitudinal motion, a cam element fixed to said shaft element, preferably at the one end thereof, and a rotatable driving element, said cam element being maintained in contact with said rotatable driving element and disposed and arranged in association therewith such that as said driving element is rotated in contact with said cam element, longitudinal motion is imparted to said shaft element. In accordance with a specific embodiment of the practice of this invention the other end of said shaft element has provided thereon a diaphragm positioned and adapted to be operated within a pump chamber to effect flow of fluid thereinto and discharge of fluid therefrom as said diaphragm is moved out and into said chamber due to the reciprocating to-and-fro longitudinal motion imparted by said shaft element to said diaphragm within said pump chamber.

More particularly, a drive mechanism in accordance with this invention comprises a shaft disposed and arranged within a bearing for translational to-and-fro motion therein, a cam plate fixed to one end of said shaft, biasing means, such as a spring, associated with said shaft intermediate one end of said bearing and one side of said cam plate effective to urge said cam plate and shaft attached thereto out of said bearing and rotary driving means maintained in contact with the other side of said cam plate, the other side of said cam plate and driving means being disposed and arranged such that as said driving means rotates in contact with the other side of said cam plate, translational motion is imparted to said shaft with the result that said shaft undergoes reciprocating to-and-fro translational motion within said sleeve bearing. In accordance with a specific embodiment of the practice of this invention, there is fixed to the other end of said shaft a diaphragm operative within a pump chamber to effect flow of fluid thereinto and discharge of fluid therefrom as said diaphragm is moved out of and into said chamber, respectively, due to the reciprocating to-and-fro translational motion of said shaft.

Referring now to the drawings which illustrate in greater detail the drive mechanism of this invention, particularly as employed in association with a diaphragm pump to operate the same, there is illustrated in the drawings a diaphragm pump provided with a conventional fluid discharge outlet 10 and fluid intake 11 together with associated one way flow or check valves 10a and 11a, respectively. The pump is provided with a front end plate 12 which is fastened to housing 14 by means of screws 13 which threadedly engage inserts in the front end 14a of housing 14. Said inserts also threadedly engage screws 16 which extend along the length of housing 14 and which retain motor mounting or back end plate 18. The inside surface 12a of front end plate 12 adjacent front end 14a of housing 14 is suitably contoured to provide an inlet passageway 11b and a discharge passageway 10b communicating with one way flow or check valves 11a and 10a, respectively, and with pump chamber 12b formed on inside surface 12a.

A flexible diaphragm 15 which may be made of any suitable material compatible with the fluid being pumped is provided operative within pump chamber 12b and effective as diaphragm 15 is moved in and out of pump chamber 12b to discharge fluid via passageway 10b, valve 10a and outlet 10 and to receive fluid via inlet 11, valve 11a and passageway 11b, respectively.

As illustrated, diaphragm 15 is fastened or anchored to one end of plunger shaft 19 by means of screw 19b which is threadedly engaged within a central opening provided at said one end of plunger shaft 19 to engage diaphragm 15 thereto. A fluid tight seal is provided between front end plate 12 and front end 14a of housing 14 by diaphragm 15 positioned between cooperating flange portion 12c of front end plate 12 and shoulder 14b provided on front end 14a of housing 14. Plunger shaft 19 is slidably received intermediate the ends of plunger shaft 19 within plunger shaft bearing 20 which is fixed to front end 14a of housing 14.

Cam plate 21 is fixed to the other end of plunger shaft 19 substantially radially thereof and perpendicular to the longitudinal axis of plunger shaft 19. Surface 21a of cam plate 21 is contoured to provide thereon two identical and diametrically spaced cam lobes 21b and valleys 21c. Spring 22 encircling plunger shaft 19 is positioned intermediate one end of plunger shaft bearing 20 abutting end surface 20a thereof and the other side 21d of cam plate 21 to urge plunger shaft 19 away from and out of plunger shaft bearing 20. A centrally disposed hole 24 is provided along the longitudinal axis of plunger shaft 19 at end portion 19a thereof to slidably receive adapter pin 25 of adapter 26 therein.

Adapter 26 is provided with bearing pin 27 fixed therein and extending transversely thereof. Bearing pin 27 carries fixed thereto ball or roller anti-friction bearings 28, bearings 28 being carried by adapter pin 27 intermediate the ends thereof and transverse projections 26a of adapter 26. One side of anti-friction bearings 28 bears upon and is in contact with side or surface 21a of cam plate 21 and the other side of anti-friction bearings 28 is in contact with and bears against surface 29a of anti-friction ball or roller thrust bearing 29 which, in turn, abuts against back end plate 18 and is maintained in position thereon by flange 18a of back end plate 18.

The end of adapter 26 opposite from cam plate 21 a provided with a centrally disposed opening 30 adapted to receive drive shaft 31. Drive shaft 31 is provided with a hole to receive pin 32 which extends therethrough and externally of slots 34 provided on either side of adapter 26 to receive pin 32.

Drive shaft 31 is directly connected to gear reducer 35 which, in turn, is driven by gear head type motor 36. Gear reducer 35 and motor 36 are enclosed within cover 38 which is provided with perforation 38a for the admission of air thereinto to cool motor 36 and gear reducer 35 with the aid of fan 39 which is also driven by motor 36 and gear reducer 35 by means of shaft 40. As indicated gear reducer 35 is fixed to back end plate 18 by means of bolts 41 and nuts 42.

Means are provided in association with the drive mechanism of this invention for adjusting the stroke of plunger shaft 19 and, accordingly, the capacity of the diaphragm pump, from zero to a given maximum. These means comprise forked plate 50 which is suitably formed at one end thereof to partially encompass plunger shaft bearing 20. The other end of forked plate 50 partially encircles rotatably mounted rod 51 which extends transversely across the upper portion of housing 14 and is rotatably mounted thereon. Forked plate 50 is fixed to rod 51 for rotation therewith by pin 52 which extends through rod 51 and that portion of forked plate 50 which encircles and is in contact with rod 51.

Means are provided for pivotally moving forked plate 50 on rod 51, said means comprising knurled knob 54 adapted to turn screw 53 which is threadedly engaged in sleeve 55 provided within the top of housing 14. As knob 54 is turned screw 53 is also turned thereby moving adjusting stud 56 threadedly engaged within screw 53. The lower end of adjusting stud 56 abuts a flat lever-arm exten- sion portion 50a of forked plate 50. As adjusting stud 56 is moved downwardly in contact with flat lever-arm extension portion 50a, forked plate 50 pivots on rod 51 and the lower end of plate 50 is thereby adjusted or moved to a new position with respect to pin 58, which extends transversely of plunger shaft 19 and through slots 20b provided in plunger shaft bearing 20.

In the operation of the drive mechanism and diaphragm pump employing the same, electrical power is supplied to motor 36 via cable 37. The output shaft 31 of gear reducer 35 by means of pin 32 fixed therein and extending therethrough into slots 34 of adapter 26 causes adapter 26 to rotate carrying with it bearing pin 27 and anti-friction bearings 28. As anti-friction bearings 28 move across and in contact with face 21a of cam plate 21 the lobes 21b and valleys 21c on cam face 21a of cam plate 21 cause plunger shaft 19 to move back-and-forth within shaft bearing 20, cam face 21a of cam plate 21 being urged to contact bearings 28 by spring 22.

As plunger shaft 19 is thus subjected to reciprocating translational movement within bearing 20, diaphragm 15 is moved in and out of pump chamber 12b causing fluid to enter pump chamber 12b via inlet 11, valve 11a, passageway 11b and to be discharged therefrom via passageway 10b, valve 10a and discharge outlet 10. Plunger shaft 19 and cam plate 21 fixed thereto are prevented from rotation within shaft bearing 20 since shaft 19 is square in cross section, as clearly shown in FIG. 6, and since shaft 19 is snugly fitted within shaft bearing 20, it cannot rotate therein.

As anti-friction bearings 28 roll and push against cam plate 21, thrust bearing 29 resists the force of anti-friction bearings 28 against cam plate 21. Thrust bearing 29 is held in position by the force of anti-friction bearings 28 in contact therewith and by flange 18a of back end plate 18 which fits relatively tightly within the interior of thrust bearing 29.

As already indicated adjustment of the stroke or movement of plunger shaft 19 within bearing 20 is made by means of forked plate 50. Forked plate 50 prevents full return of plunger shaft 19 under the urging of spring 22 when adjusting stud 56 is fully adjusted downwardly into contact with lever-arm extension 50a of forked plate 50 so that the lower end of forked plate 50 engages pin 58 to prevent the full return of plunger shaft 19 under the urging of spring 22.

The knurled knob or stroke adjusting dial 54 is graduated in terms of remaining effective stroke or of pump discharge and is arranged such that one full turn of adjusting knob 54 covers a range of from zero pump discharge to 100% pump discharge capacity. Suitable markings or graduations 58b indicative of percent of pump discharge capacity or actual pump discharge volume per unit time are indicated on plate 58a fixed to the top of housing 14 and pointer 54a is fixed to knurled knob 54 to indicate the pump discharge setting. Also, it is pointed out that upon installation, or whenever desired, adjustment of stud 56 in relation to screw 53 makes it possible to adjust the registration of pointer 54a in relation to graduations 58b. As indicated in the drawings the drive mechanism and motor and gear reducer are mounted on stand 60, housing 14 being fixed thereto by means of threaded bolt 61 and nut 62.

The drive mechanism provided in accordance with this invention has a number of advantages over conventional drive mechanisms. For example the cam plate 21 can be shaped or formed in a manner that will produce an optimum type of stroke characteristic. Cam plate 21 can be provided with lobes and valleys such that the discharge stroke will be long and gradual with a quick suction stroke so as to provide a good pump discharge characteristic, low peak torque input and low resisting torque. Also, since the plunger shaft thrust is resisted through the anti-friction thrust bearing and the back end plate of the housing, none of the thrust is transmitted to the motor bearings. Additionally, since the motor is transmitting only torque, this is taken advantage of by coupling the motor with a simple pin and slot type slip coupling. This arrangement eliminates the need for skill in aligning the motor or coupling when the motor is installed or replaced. Also, the simple forked plate 50 configuration in asscciation with the plunger shaft pin 58 gives zero to 100% of a given maximum stroke adjustment with one revolution of the knurled adjusting knob 54 with a substantially linear relationship of pump discharge to degrees of knob rotation.

As will be apparent to those skilled in the art in the light of the accompanying disclosure, many modifications, changes and substitutions are possible in the practice of this invention without departing from the spirit or scope thereof.

We claim:

1. Apparatus comprising a fixed housing, a shaft provided within said housing and mounted for reciprocating to-and-fro translational movement, a bearing supporting said shaft for sliding movement therein, a cam plate fixed to one end of said shaft, said cam plate being disposed on said shaft substantially perpendicularly to the longitudinal axis of said shaft and provided on one side of said cam plate with a cam surface, said cam surface being provided with a cam lobe and a cam valley, a spring associated with said shaft and bearing against one end of said bearing and the other side of said cam plate and effective to urge said cam plate and said shaft away from said bearing, anti-friction rotary driving means disposed adjacent said cam plate and in contact with said cam surface thereon, means to rotate said rotary driving means, a pin transversely carried by said shaft intermediate the ends thereof and extending therethrough into slots provided in said bearing and stop means fixed to said housing effective upon contact with said pin to arrest movement of said shaft carrying said pin.

2. Apparatus comprising a fixed housing, a plunger shaft within said housing and mounted for reciprocating to-and-fro translational movement, a plunger bearing supporting said shaft for sliding translational movement therein, a cam plate fixed to one end of said plunger shaft, said cam plate being provided with a cam surface on one side thereof disposed substantially perpendicular to the longitudinal axis of said plunger shaft, said cam surface having formed thereon a cam lobe and a cam valley, a spring intermediate the other side of said cam plate and said plunger bearing and in contact with one end of said plunger bearing and said other side of said cam plate, a rotatable member positioned axially of said plunger shaft disposed adjacent said one side of said cam plate, an anti-friction bearing mounted on said rotatable member and in contact with said cam surface, a thrust bearing fixed to said housing and in contact with said anti-friction bearing, means to rotate said rotatable member, a pin transversely carried by said plunger shaft and extending therethrough into slots provided in said plunger bearing and stop means fixed to said housing effective upon contact with said pin to arrest the movement of said plunger shaft carrying said pin.

References Cited in the file of this patent

UNITED STATES PATENTS

| 608,361 | Craig | Aug. 2, 1898 |
| 838,728 | Lockwood | Dec. 18, 1906 |
| 1,208,858 | Swan | Dec. 19, 1916 |
| 1,310,575 | Kollock | July 22, 1919 |
| 1,900,284 | Herzmark | Mar. 9, 1933 |
| 1,937,019 | Hamill | Nov. 28, 1933 |
| 2,031,346 | Wahlmark | Feb. 18, 1936 |
| 2,211,741 | Elwell | Aug. 13, 1940 |
| 2,308,974 | Harper | Jan. 19, 1943 |
| 2,323,950 | Wade | July 13, 1943 |
| 2,500,812 | Frederick | Mar. 14, 1950 |
| 2,592,237 | Bradley | Apr. 8, 1952 |
| 2,643,649 | Tarwater | June 30, 1953 |
| 2,819,678 | Nordell et al. | Jan. 14, 1958 |
| 2,972,894 | Bennett | Feb. 28, 1961 |
| 3,058,369 | Vogel | Oct. 16, 1962 |
| 3,107,631 | Canfield | Oct. 22, 1963 |

FOREIGN PATENTS

| 901,131 | Germany | Feb. 1, 1954 |
| 721,695 | Great Britain | Jan. 12, 1955 |